Aug. 11, 1936.  W. M. BROWER  2,050,827
ELECTRIC CLOCK
Filed March 5, 1932   3 Sheets-Sheet 1
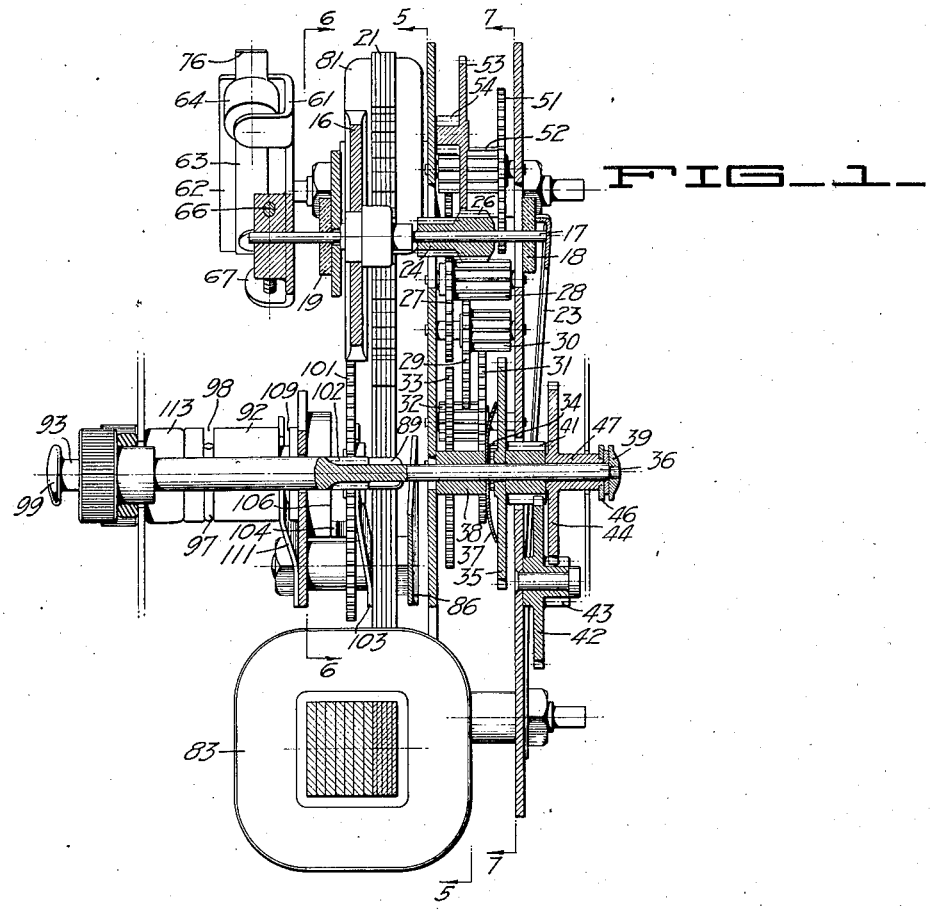
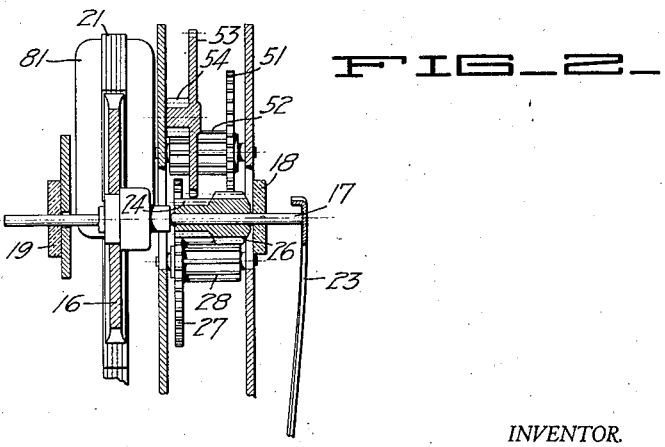
INVENTOR.
William M. Brower
BY
White, Prost, Fleur & Lothrop
ATTORNEYS.

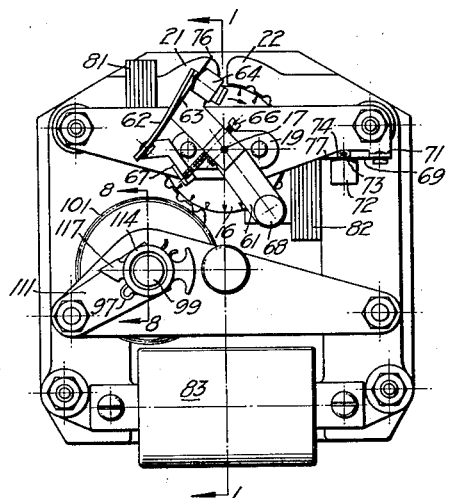
FIG_3_
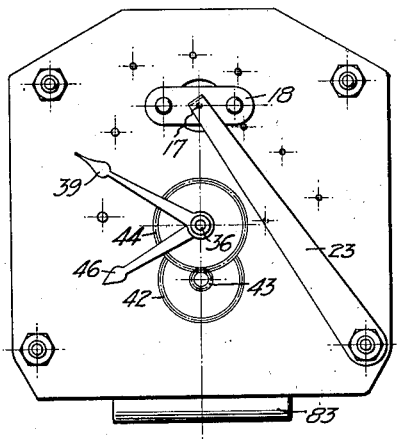
FIG_4_
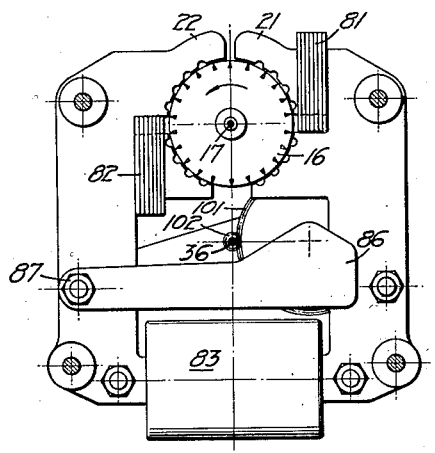
FIG_5_
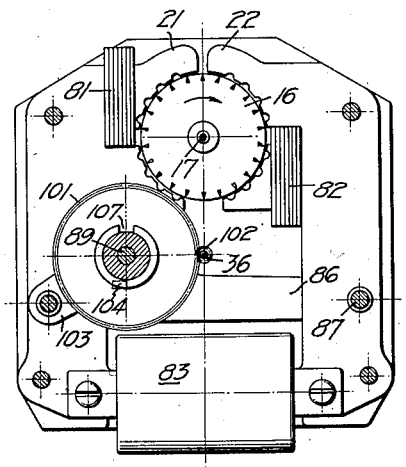
FIG_6_
INVENTOR.
William M. Brower
BY
White, Prost, Fisher & Lothrop
ATTORNEYS.

Aug. 11, 1936.　　W. M. BROWER　　2,050,827
ELECTRIC CLOCK
Filed March 5, 1932　　3 Sheets-Sheet 3
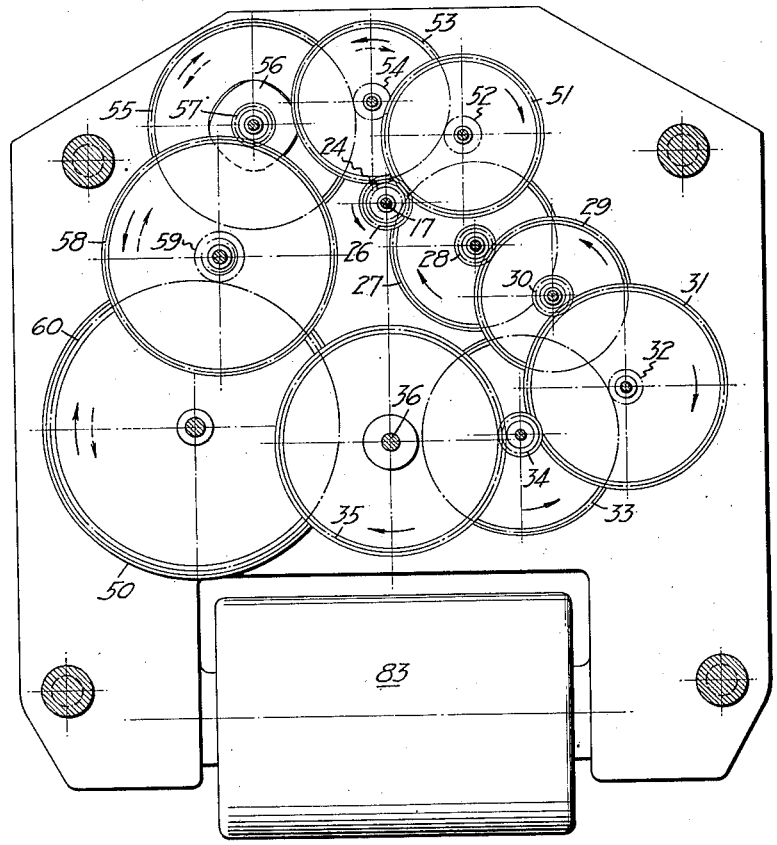
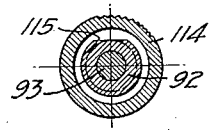
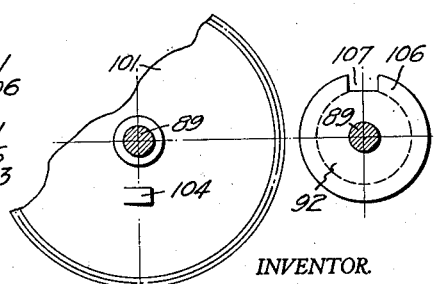
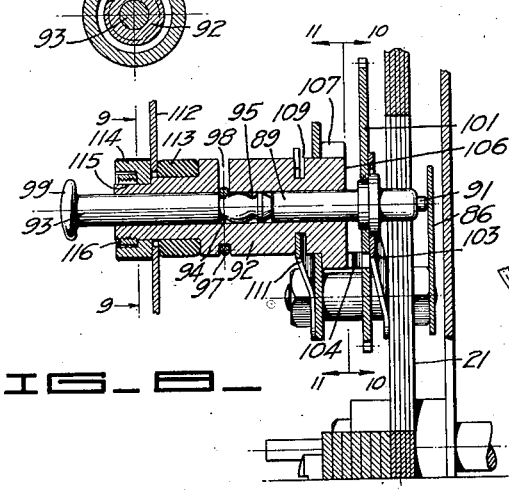
INVENTOR.
William M. Brower
BY White, Prost, Flehr & Lothrop
ATTORNEYS.

Patented Aug. 11, 1936

2,050,827

UNITED STATES PATENT OFFICE 2,050,827

ELECTRIC CLOCK

William M. Brower, Palo Alto, Calif., assignor to Stanford Products, Ltd., San Francisco, Calif., a corporation of California Application March 5, 1932, Serial No. 597,003

5 Claims. (Cl. 58—26)

This invention relates to electric clocks and more particularly it relates to a clock of the type which is adapted to be energized by current derived from a commercial source of alternating current.

It is one object of the invention to provide a clock driven by a synchronous electric motor in which novel means is provided for continuing the operation of the clock upon interruption of the energizing current.

Another object is to provide means for storing energy during the periods that the clock is energized, which energy is to be used for driving the clock in the event that an interruption occurs in the energizing current.

Another object is to provide a clock of the character described in which a synchronous electric motor is employed for driving the hands of the clock and for winding a spring motor when the electric motor is energized, and means whereby the energy stored in the spring motor is employed to rotate the motor armature when the motor is deenergized at a rate which is approximately equal to the synchronous speed of the motor.

Another object is to provide a clock in which a single electromagnetic winding is provided which serves to energize a synchronous motor, to wind a spring motor and to actuate an audible alarm.

Another object is to provide a non-self-starting synchronous motor in a clock of the character described and means for causing said motor to start and to obtain synchronous speed when the motor armature is set in motion sufficiently to overcome its static friction.

Another object is to provide an audible alarm in a clock of the character described which is energized by the field winding of the synchronous motor.

Another object is to provide a novel governor for controlling the rate of rotation of the motor armature when it is being driven by the spring motor of the clock.

Another object is to provide a motor armature which is axially movable between two positions, means for biasing the armature in one of these positions and driving means controlled by movement of the armature from one axial position to the other.

Another object is to provide a gear train in which certain gears are shifted in response to axial movement of the motor armature in the aforementioned manner.

These and other objects and advantages are attained in the embodiment of my invention illustrated in the accompanying drawings, in which:

Fig. 1 is a cross sectional view taken along the plane indicated by line 1—1 of Fig. 3, illustrating the interior construction of a clock incorporating the principles of this invention. In Fig. 1, the motor armature is shown in the axial position it assumes when the motor is deenergized.

Fig. 2 is a fragmentary cross sectional view taken along the same plane as Fig. 1, illustrating the axial position that the motor armature assumes when the motor is energized.

Fig. 3 is a rear elevational view of the clock, the external case having been removed to show the interior construction.

Fig. 4 is a front elevational view, the clock face having been removed to show the interior construction.

Fig. 5 is a cross sectional view taken along the plane indicated by line 5—5 of Fig. 1.

Fig. 6 is a cross sectional view taken along the plane indicated by line 6—6 of Fig. 1.

Fig. 7 is a cross sectional view taken along the plane indicated by line 7—7 in Figure 1.

Fig. 8 is a cross sectional view taken along the plane indicated by line 8—8 of Fig. 3, illustrating the audible alarm mechanism.

Figs. 9, 10 and 11 are detail cross sectional views taken along the lines 9—9, 10—10, and 11—11, respectively, of Fig. 8, illustrating certain details of the alarm mechanism.

In its preferred form, the clock of this invention comprises a synchronous electric motor which is adapted to be energized by current derived from a suitable source of alternating current, such as the commercial source of alternating current of 25 or 60 cycles. A gear train having the proper gear ratio interconnects the synchronous motor with the hands of the clock to move the minute hand thereof exactly one revolution every sixty minutes and to move the hour hand proportionally. Preferably, the electric motor is connected through the intermedium of a gear train to a spring motor, so that when the electric motor is energized, the spring motor is wound up. To preclude winding of the spring motor beyond a definite degree of tension, a friction clutch is interposed in the gear train between the electric motor and the spring motor, which clutch is caused to slip when the energy stored in the spring motor reaches a predetermined value. Thereafter, continued energization of the electric motor serves to retain the spring motor in wound condition, but does not increase the tension of the spring beyond the desired value.

If for any reason whatever an interruption should occur in the energizing current, it is desired that the energy stored in the spring motor be expended in driving the clock until the current is restored. It is also desired to rotate the motor armature in its normal direction of rotation at approximately synchronous speed so that upon resumption of the current, the drive can be transferred from the spring motor to the electric motor without loss of time during the change-over. For accomplishing this object, the motor armature is made axially movable from one position which it assumes when the motor is energized to another position which it assumes when the motor is deenergized. In moving axially, certain gears are shifted by the motor armature to reverse the direction of drive of the gear train between the electric motor and the spring motor, so that the motor armature is rotated by the spring motor in the same direction that the armature rotates in winding the spring. Preferably, the gear ratio in the gear train is also changed upon movement of the motor armature in such a manner that energy is stored in the spring at a slower rate than that at which it is expended. This feature enables the use of a smaller synchronous motor, since the energy expended in winding the spring motor is smaller than it would be if the gear ratio of the gear train remained the same during the winding and unwinding operations. A longer period can be allotted to the winding of the spring than to the unwinding thereof without disadvantage, since during any normal operation of the clock, periods of current interruption will be rare and of short duration.

Preferably, a governor is provided for controlling the rate of rotation of the motor armature during the time it is driven by the spring motor. It is desired that the governor have no influence over the rate of rotation during the period that the motor is energized and for this reason the governor which is provided maintains the rate of rotation of the motor armature at a point which is just a trifle over the normal synchronous speed of the motor. For establishing a high degree of accuracy in this regard, a specially designed governor having the novel construction illustrated can be employed.

The electric motor employed is of the synchronous type and to enhance the starting and running characteristics of the motor, shading coils can be associated with the field poles in a manner which will be more fully described hereinafter. The shading coils serve to impart certain characteristics to the motor corresponding to those possessed by an induction motor, as distinguished from a synchronous motor, and consequently, it is not necessary that the motor be brought up to synchronous speed before it will start under its own power. The motor does not need to be fully self-starting, since during periods of current interruption the motor armature is rotated by the spring motor. Damping means and other auxiliary devices commonly associated with self-starting synchronous motors can be avoided, therefore, by designing the parts so that the motor is not fully self-starting, but so that the motor will start initially if it is shaken or otherwise agitated sufficiently to overcome its static friction. After the electric motor has once been set in operation, the spring motor will become wound and the momentum of the motor armature when driven by the spring motor is sufficient to cause the electric motor to start automatically at the termination of any ordinary current interruption occurring thereafter.

Preferably, the field winding of the synchronous motor is also employed to energize an audible alarm and means is provided for rendering the alarm inaudible when it is not desired that it be heard. Setting mechanism can be provided for setting the alarm at any desired time, as in the well known alarm clock. In the present instance, however, the alarm is preferably continuously energized, but is rendered inaudible until the time for which the alarm is set arrives, at which time the alarm is rendered audible.

Referring now to the accompanying drawings and first to Figs. 1, 2 and 7 thereof, I have shown a synchronous electric motor having a rotor or armature 16. The armature 16 is mounted on a shaft 17 which is journaled for rotation in bearing members 18 and 19. The bearings 18 and 19 are so disposed that the armature shaft is free to move in an axial direction from the position shown in Fig. 1 to the position shown in Fig. 2. When the motor is energized, the armature is drawn into alignment with the field poles 21 and 22, as shown in Fig. 2, under the influence of the magnetic force set up in the field structure of the motor. A biasing spring 23 bears against one end of the armature shaft 17 and tends to urge the armature to the axial position shown in Fig. 1. The force of the biasing spring 23 is overcome when the motor is energized, but upon deenergization of the motor, the armature is caused to assume the position shown in Fig. 1 under the influence of the force exerted by the spring 23.

Rigidly fixed to the armature shaft 17 is a pinion 24 of small diameter and a pinion 26 of a larger diameter. The pinion 24 meshes with a gear 27 and the teeth on this pinion are sufficiently wide to make meshing engagement with the gear 27 in either axial position of the shaft 17. Pinion 24 is one element in a gear train, which will be referred to as the clock gear train, interconnecting the electric motor with the hands of the clock. Pinion 26, however, is part of another gear train which interconnects the electric motor with a spring motor and the latter gear train will be referred to in the present description as the spring gear train.

The clock gear train comprises a series of intermeshing gears and pinions suitably journaled for rotation in supporting plates and in order to avoid monotony in the description each of the elements in this gear train will not be described separately in detail. The clock gear train comprises in the order named the following elements, each serving to impart motion to the element following it in the list: pinion 24, gear 27, pinion 28, gear 29, pinion 30, gear 31, pinion 32, gear 33, pinion 34 and gear 35. Gear 35 is loosely mounted on a minute hand shaft 36 but imparts rotation to the shaft through a friction clutch comprising a friction disc 37 interposed between one face of the gear 35 and a collar 38 fixed to the shaft 36. The minute hand 39 is mounted on the end of shaft 36. Secured to the shaft 36 is a pinion 41 and meshing with pinion 41 is gear 42. Secured to rotate with the gear 42 is a pinion 43 and meshing with pinion 43 is gear 44 loosely mounted on shaft 36. An hour hand 45 is mounted on a sleeve 47 secured to the gear 44. The gear ratio of the train between shaft 36 and sleeve 47 is twelve to one, so that the minute hand and the hour hand are turned at the proper rate relative to each other. The friction drive interposed between the gear 35 and the shaft 36 enables setting of the clock without actuating the clock gear train in accordance with the usual practice.

When the electric motor is energized and the armature 16 is in the position shown in Fig. 2, the pinion 26 meshes with a gear 51 and serves to wind a spring motor 50 through a train of gears comprising the gear 51, pinion 52, gear 53, pinion 54, gear 55, a friction clutch 56, pinion 57, gear 58, pinion 59 and gear 60, to which one end of the spring (not shown) of the spring motor 50 is secured. During energization of the electric motor, therefore, the spring motor 50 is gradually wound up, the gears in the spring gear train running in the direction of the arrows shown in solid lines in Fig. 7 during the winding operation. The friction clutch 56 between the gear 55 and the pinion 57 can have any suitable construction, and in the form illustrated, it comprises a warped disc of resilient metal secured to the pinion 57 and bearing resiliently against one side of the gear 55. The friction of the clutch is made such that when the spring motor has been wound to a desired degree of tension, the clutch will allow the gear 55 to be turned relative to the pinion 57. As long as the electric motor continues to operate, therefore, the gear 55 will turn and its movement is transmitted to the spring motor 50 until the spring becomes fully wound, but thereafter the turning movement of the gear 55 merely serves to preclude unwinding of the spring, thereby maintaining the energy stored in the spring at a substantially constant maximum level until the spring motor is needed.

Now, if for any reason the energizing current of the electric motor should be interrupted, the armature 16 is moved axially to the position shown in Fig. 1 under the force of the biasing spring 23, since the magnetic flux of the field is no longer present to hold the armature in the position shown in Fig. 2. Upon movement of the armature from the position shown in Fig. 2 to the position shown in Fig. 1, the pinion 26 disengages the gear 51 and is shifted into meshing engagement with the gear 53. When the pinion 26 is shifted in this manner, the direction of drive of the spring gear train is reversed and at the same time the gear ratio of the gear train is reduced by reason of the exclusion of gear 51 from the train. During this axial movement of the motor armature, the clock gear train remains unaffected, since, as heretofore mentioned, the pinion 24 is made sufficiently wide to mesh with the gear 27 in either axial position of the motor armature. When the energizing current is interrupted, the relationship between the electric motor and the spring motor is reversed and the spring motor becomes the driving member and the electric motor becomes the driven member. Because of the shifting of gears in the spring gear train, the direction of rotation of the motor armature 16 is the same when rotated by the spring motor as it is when the electric motor is energized and is running under its own power. The direction of rotation of the gears in the clock gear train remains the same, therefore, whether the clock gear train is driven by the electric motor or by the spring motor. The gears in the spring gear train, however, rotate in the opposite direction, as indicated by the dotted arrows in Fig. 7, when the spring motor becomes the driving member. The gear train between the spring motor and the hands of the clock comprises the gear 60, pinion 59, gear 58, pinion 57, gear 55, pinion 54, gear 53, pinion 26, pinion 24, gear 27, pinion 28, gear 29, pinion 30, gear 31, pinion 32, gear 33, pinion 34 and gear 35 of the minute hand shaft. It will be noticed that the gear 51 is excluded from the spring gear train when the electric motor is deenergized and that this gear runs idle. The exclusion of gear 51 from the spring gear train changes the gear ratio of the train between the electric motor and the spring motor, so that energy is stored in the spring motor at a relatively slow rate and is expended at a rate which is sufficiently high to drive the clock mechanism at the proper speed. This feature enables the use of an electric motor of smaller size than would be required otherwise, since the energy of the electric motor which is expended toward winding the spring is slight.

For controlling the rate of rotation of the motor armature 16 when it is driven by the spring motor, a governor is provided which comprises an arm 61 secured to the shaft 17. Mounted on one end of the arm 61 is a structure 62 in the form of a bell crank lever which carries a resilient arm 63 in the manner illustrated in Fig. 3. A fly weight 64 is mounted on the free end of the resilient arm 63 and during rotation of the governor, the weight 64 is moved outwardly from the axis of rotation in response to the centrifugal force arising from the speed of rotation. For adjusting the governor, an adjusting screw 66 is provided which passes through the arm 61 and abuts against the arm 67 of the bell crank structure 62. By turning the screw 66, the normal position of the weight 64 can be adjusted within suitable limits. The other end of arm 61 carries a counterweight 68 which serves to counterbalance the governor so that the center of the mass of the rotating parts coincides with the axis of rotation. Cooperating with the resilient arm 63 and the weight 64 thereon to regulate the speed is a relatively fixed resilient arm 69 secured at one end, as at 71, to the stationary framework of the clock. Near the free end of arm 69 a weight 72 is mounted to increase the inertia of arm 69. Normally the arm 69 bears against a stop pin 73 which can be covered with rubber or other suitable sound deadening material, as at 74.

When the rate of rotation of the governor reaches a predetermined speed, the arm 63 and the weight 64 swing outwardly so that the extreme end 76 of the rotating arm 63 strikes the extreme end 77 of the relatively fixed arm 69 thereby retarding the rate of rotation. The arm 69 yields under the force of the impact, if the impact is sufficiently great, and is moved away from the pin 73 to allow the arm 63 to pass, but the recoil of the arm 69 restores it to its normal position against the pin 73 so that it is in position to meet the arm 69 on the next revolution of the governor. The force of the impact also moves the arm 63 to carry the weight 64 outwardly from the center of rotation, thereby increasing the moment of inertia of the governor about its axis of rotation. Thus, the retardation of the governor is not only due to the breaking effect of the impact between arms 69 and 63, but it is also due to the increase of the moment of inertia of the governor immediately following the impact. By employing a governor of this construction, the speed of rotation of the armature can be controlled within close limits. Preferably, the governor is so adjusted that when the armature 16 is rotated at the synchronous speed of the motor, the arm 63 just misses the arm 69. When the speed of rotation is a trifle higher the arms are caused to strike and the rate of rotation is retarded as described above. The motor armature is in this manner rotated by the spring motor at a rate which is approximately equal to its synchronous speed. The difference between the rate of rotation of the motor armature when it is running at synchronous speed and when it is being driven by the spring motor is so slight that clocks constructed in accordance with the invention gain one minute or less over a period of forty-five minutes when driven by the spring motor. When it is considered that current interruptions due to the most common causes are of short duration, any inaccuracy resulting from this discrepancy is negligible.

Preferably, the motor is constructed so that it is not self-starting, thereby avoiding the use of special damping means or other auxiliary devices incidental to self-starting synchronous motors. However, it is desirable that the motor start easily so that unskilled persons will not encounter any difficulty initially setting the clock in motion. For accomplishing this object, shading coils 81 and 82 are provided which are disposed about a portion of each of the field poles 21 and 22, as illustraed in Figs. 5 and 6. The coils 81 and 82 are preferably in the form of a continuous ring built up of laminations of metal having good electrical conductivity, such as copper. Current induced in the coils 81 and 82 sets up a magnetic field which is displaced in phase from the magnetic field set up by the field winding 83 of the motor. Thus, a rotating field effect is produced which tends to render the motor self-starting. To accentuate the effect of the shading coils 81 and 82, the armature 16 can have a copper plating over an inner structure of magnetic metal. The magnetic structure of the armature 16 cooperates with the field poles 21 and 22 in a well known manner to impart to the motor the characteristics of a synchronous motor and the copper plating on the armature together with the shading coils 81 and 82 of the field serve to impart the characteristics of the so-called squirrel cage induction motor. The synchronous motor characteristics, however, are purposely made to predominate so that while the motor is not entirely self-starting, it will start when it is agitated sufficiently to overcome its static friction. In other words, the motor will not start of its own accord merely upon closing the energizing circuit, but it will start and attain synchronous speed if the clock is shaken or if the motor armature is manually turned to any extent whatsoever. It is not necessary, as in the ordinary synchronous motor, to bring the armature up to synchronous speed before the motor will start under its own power.

A vibratory audible alarm can also be provided in the clock so that it may be used as an alarm clock and preferably the field winding 83 of the motor is employed to energize this alarm. For accomplishing this object, a vibratory member 86 of resilient magnetic metal is secured at one end, as at 87, to one of the field poles 22 of the motor and the other end of 86 is free and extends adjacent the other field pole 21 of the motor. The reversal of the magnetic flux in the field poles 21 and 22 serves to vibrate the member 86 and when no restraint is imposed on the vibratory member, the free end thereof strikes against the field pole 21, thereby setting up an audible alarm. Means is provided, however, for restraining the movement of member 86 so that it can be rendered inaudible until it is desired that the alarm shall be heard.

Thus, in Fig. 8, a shaft 89 is shown which is adapted to be moved longitudinally from the position illustrated in which the end 91 of the shaft engages the vibratory member 86 to another position in which the end 91 is withdrawn from contacting engagement. The shaft 89 is slidably supported in a sleeve 92 and a movable control rod 93 extending within the sleeve abuts against the left hand end of shaft 89, as viewed in Fig. 8, to limit the longitudinal movement of the shaft 89 toward the left. The control rod is provided with a pair of annular grooves 94 and 95 and a spring retaining clip 97 disposed within a slot 98 cut in the sleeve 92 engages one or the other of the grooves 94 or 95 to hold the control rod in the position to which it is moved in the sleeve 92. A button 99 is disposed on the outer end of rod 93 and by exerting pull upon this button, the rod 93 can be moved longitudinally from the position illustrated to a position in which the clip 97 engages the groove 95. The end of rod 93 is thereupon moved away from the end of the shaft 89, so that the rod 93 does not interfere with the longitudinal movement of the shaft 89 toward the left.

A gear 101 is secured to the shaft 89 and this gear meshes with a pinion 102 secured to the shaft 36 of the minute hand of the clock. The gear ratio between the gear 101 and the pinion 102 can be twelve to one or twenty-four to one so that the gear 101 makes one complete revolution every 12 hours or every 24 hours, as the case may be. Bearing against one side of the gear 101 is a biasing spring 103 which urges the gear 101 and the shaft 89 on which it is carried towards the left, as viewed in Fig. 8. When the rod 93 is moved outwardly, the spring 103 tends to move the shaft 89 out of engagement with the vibratory member 86, but this movement is precluded by a projection 104 on the side of gear 101 which abuts against the end face 106 of sleeve 92, thereby holding the parts in the relationship shown in Fig. 8. Upon rotation of the gear 101 with the hands of the clock, the projection 104 is carried around until it coincides with a notch 107 or other suitable depression in the end face 106 of the sleeve 92. Assuming that the control rod 93 has been moved to its outward position, the projection 104 will enter the notch 107 and the shaft 89 will be moved toward the left under the force of the spring 103, thereby removing the restraint upon the vibratory member 86. The end of the vibratory member 86 is then free to strike the adjacent field pole 21 and being continuously energized by the magnetic flux in the field poles, it will vibrate violently and set up an audible alarm. To quiet the alarm, the control rod 93 can be moved to the position shown in Fig. 8, thereby forcing the end 91 of shaft 89 against the vibratory element 86.

To provide means for setting the alarm to respond to any predetermined time, the sleeve 92 is mounted in such a manner that it can be turned to bring the notch 107 into different positions relative to the cooperating projection 104 on the gear 101. Thus, a groove 109 is formed in the sleeve and a bracket 111 fixed to the framework of the clock engages the groove to support the sleeve for turning movement. The outer end of the sleeve is of reduced outside diameter and passes through an aperture in the back plate 112 of the clock casing. The bracket 111 can be formed of resilient metal and can be so shaped that it tends to hold the sleeve snugly against the back plate. A suitable spacing member 113 can be disposed about the sleeve 92 adjacent the back plate. For rotating the sleeve 92 to bring the notch 107 in any desired position, a knurled actuating knob 114 can be provided. The surface of the sleeve adjacent the knob can be made with a flat portion 115 and the opening in the knob 114 which receives the shaft can be similarly shaped so that the knob and the shaft will turn together at all times. The extreme outer end of the sleeve 92 can be threaded for receiving an annular retaining nut 116 for the knob 114. A pointer arm 117, shown in Fig. 3, can be carried by the knob 114 and cooperating graduations (not shown) can be marked on the back plate of the clock casing to indicate the time for which the alarm is set. By this construction, the sleeve 92 will be frictionally held between the bracket 111 and the back plate 112 in any position to which it may be moved by the knob 114.

To start the clock all that is necessary is to connect the field winding 83 to a suitable source of alternating current and then shake the clock gently until the motor armature is agitated sufficiently to overcome its static friction. Thereupon, the rotating field produced by the energizing current will bring the armature up to synchronous speed and it will be maintained at this speed as long as the motor remains energized. The magnetic flux set up in the field structure of the motor holds the armature of the motor in the axial position shown in Fig. 2, that is, the armature is in alignment with the field structure and the pinion 26 is moved into meshing engagement with the gear 51 of the spring gear train. While the motor is energized, part of its energy is expended in winding the spring motor 50 and when the spring motor 50 becomes fully wound, the friction clutch 56 between gear 55 and pinion 57 is caused to slip, thereby maintaining the stored energy in the spring motor at a constant level. The field winding 83 of the motor also serves to energize the audible alarm and upon setting the actuating knob 114 at some definite time and moving the control rod 93 to its outward position, the alarm will be made to sound at the time for which the alarm has been set. Thus, the field winding of the electric motor performs three functions; first, its primary function of energizing the field of the electric motor; second, to energize the audible alarm; and third, to supply energy for winding the spring motor 50.

Upon interruption of the current, the armature 16 will be shifted axially by the spring 23 to the position shown in Fig. 1, thereby reversing the direction of drive of the spring gear train and reducing its gear ratio. The energy which has been stored in the spring motor 50 is then expended in rotating the motor armature in its normal direction of rotation, the governor associated with the armature serving to maintain the speed thereof at approximately synchronous speed, but just a trifle higher. The spring motor can conveniently be made to store sufficient energy to run the clock for at least 45 minutes, so that if the energizing current is restored within this period, the motor armature will run again under its own power. When the current is restored, the armature is again moved into alignment with the field structure of the motor to shift gears in the spring gear train, so that the energy expended in tiding over the period of current interruption will be restored in the spring motor. Thus, the clock will run continuously irrespective of current interruptions, providing no current interruption occurs which is of longer duration than that for which the spring motor 50 is designed to provide.

While I have shown and described a preferred form of the clock of my invention, it is to be understood that I do not wish to be limited thereto, since the invention, as defined in the appended claims can be embodied in a plurality of other forms.

I claim:

1. In an electric clock, a synchronous electric motor having a field structure and a rotatable armature, said armature being normally in alignment with the field structure when the motor is energized, means for biasing said armature axially out of alignment with the field structure, said biasing means being operative to move the armature out of alignment with the field structure upon deenergization of said motor, a spring motor, a gear train interconnecting said armature and said spring motor serving to wind said spring motor when the electric motor is energized, and means for shifting certain gears in said gear train controlled by movement of said armature into and out of alignment with the field structure, the direction of the drive of said gear train being reversed upon shifting of the gears, whereby the motor armature is driven in its normal direction of rotation by said spring motor when the electric motor is deenergized.

2. In an electric clock, a synchronous electric motor having a field structure and a rotatable armature, said armature being normally in alignment with the field structure when the motor is energized, means for biasing said armature axially out of alignment with the field structure, said biasing means being operative to move the armature out of alignment with the field structure upon deenergization of said motor, a spring motor, a gear train interconnecting said armature and said spring motor serving to wind said spring motor when the electric motor is energized, and means for shifting certain gears in said gear train controlled by movement of said armature into and out of alignment with the field structure, the gear ratio of said gear train being greater when the armature is in alignment with the field structure than when it is out of alignment, whereby energy is stored in said spring motor at a rate which is slower than the rate at which the stored energy is expended.

3. In an electric clock, a synchronous electric motor having a field structure and a rotatable armature, said armature being normally in alignment with the field structure when the motor is energized, means for biasing said armature axially out of alignment with the field structure, said biasing means being operative to move the armature out of alignment with the field structure upon deenergization of said motor, a spring motor, a gear train interconnecting said armature and said spring motor serving to wind said spring motor when the electric motor is energized, means for shifting certain gears in said gear train controlled by movement of said armature into and out of alignment with the field structure, the direction of the drive of said gear train being reversed upon shifting of the gears, whereby the motor armature is driven in its normal direction of rotation by said spring motor when the electric motor is deenergized, a clock hand, a second gear train interconnecting said motor armature and said clock hand, whereby said clock hand is driven by said motor armature when the electric motor is energized and is driven by said spring motor when the electric motor is deenergized.

4. In an electric clock, a synchronous electric motor having a field structure and a rotatable armature, said armature being normally in alignment with the field structure when the motor is energized, means for biasing said armature axially out of alignment with the field structure, said biasing means being operative to move the armature out of alignment with the field structure upon deenergization of said motor, a spring motor, a gear train interconnecting said armature and said spring motor serving to wind said spring motor when the electric motor is energized, means for shifting certain gears in said gear train controlled by movement of said armature into and out of alignment with the field structure, the gear ratio of said gear train being greater when the armature is in alignment with the field structure than when it is out of alignment, whereby energy is stored in said spring motor at a rate which is slower than the rate at which the stored energy is expended, a clock hand, a second gear train interconnecting said motor armature and said clock hand, said clock hand being driven by said motor armature when the electric motor is energized and being driven by said spring motor when the electric motor is deenergized.

5. In an electric clock, a synchronous electric motor having a field structure and a rotatable armature, said armature being normally in alignment with the field structure when the motor is energized, and means for biasing said armature axially out of alignment with the field structure, said biasing means being operative to move the armature out of alignment with the field structure upon deenergization of said motor, a spring motor, a gear train interconnecting said armature and said spring motor serving to wind said spring motor when the electric motor is energized, means for shifting certain gears in said gear train controlled by movement of said armature into and out of alignment with the field structure, the direction of rotation of certain gears in said gear train being reversed upon shifting of the gears, whereby the motor armature is driven in its normal direction of rotation by said spring motor when the electric motor is deenergized, and a governor mounted to turn with said armature, said governor serving to maintain the rate of rotation of said armature when the motor is deenergized approximately equal to the rate at which the armature rotates when the motor is energized.

WILLIAM M. BROWER.